(12) United States Patent
Sakai et al.

(10) Patent No.: US 7,450,304 B2
(45) Date of Patent: Nov. 11, 2008

(54) AUTOSTEREOSCOPIC DISPLAY

(75) Inventors: Hideyuki Sakai, Yokohama (JP); Michio Oikawa, Sagamihara (JP); Takafumi Koike, Sagamihara (JP); Masami Yamasaki, Sagamihara (JP)

(73) Assignee: Hitachi Displays, Ltd., Chiba (JP)

( * ) Notice: Subject to any disclaimer, the term of this patent is extended or adjusted under 35 U.S.C. 154(b) by 123 days.

(21) Appl. No.: 11/344,315

(22) Filed: Jan. 30, 2006

(65) Prior Publication Data

US 2006/0176245 A1  Aug. 10, 2006

(30) Foreign Application Priority Data

Feb. 4, 2005  (JP)  ............... 2005-029017

(51) Int. Cl.
*G02B 27/22* (2006.01)
*H04N 9/47* (2006.01)

(52) U.S. Cl. ............... 359/463; 359/462; 348/59

(58) Field of Classification Search ............... 359/462, 359/463, 450, 596; 348/59
See application file for complete search history.

(56) References Cited

U.S. PATENT DOCUMENTS

| | | | | |
|---|---|---|---|---|
| 4,911,529 | A | * | 3/1990 | Van De Ven ............... 359/454 |
| 5,254,388 | A | * | 10/1993 | Melby et al. ............... 428/120 |
| 5,465,175 | A | * | 11/1995 | Woodgate et al. ........... 359/463 |
| 2005/0007000 | A1 | * | 1/2005 | Chou et al. ............... 313/116 |

FOREIGN PATENT DOCUMENTS

| | | |
|---|---|---|
| JP | 03-194588 | 8/1991 |
| JP | 04-107420 | 4/1992 |
| JP | 06-289320 | 10/1994 |
| JP | 07-322305 | 12/1995 |

* cited by examiner

*Primary Examiner*—Audrey Y Chang
(74) *Attorney, Agent, or Firm*—Townsend and Townsend and Crew LLP (57) ABSTRACT

An autostereoscopic display includes a display having a non-luminescence area between two adjacent pixels. Each pixel includes a blue subpixel, a red subpixel, and a green subpixel. A lens sheet including a lot of lenses is configured over the display. A diffusion board is placed between the display and the lens sheet. The diffusion board has a trench disposed over the non-luminescence area between two adjacent pixels.

16 Claims, 8 Drawing Sheets

AUTOSTEREOSCOPIC DISPLAY

BACKGROUND OF THE INVENTION

This invention concerns the autostereoscopic display which can especially observe the stereoscopic vision by the naked eye for the autostereoscopic display.

Figure 14:
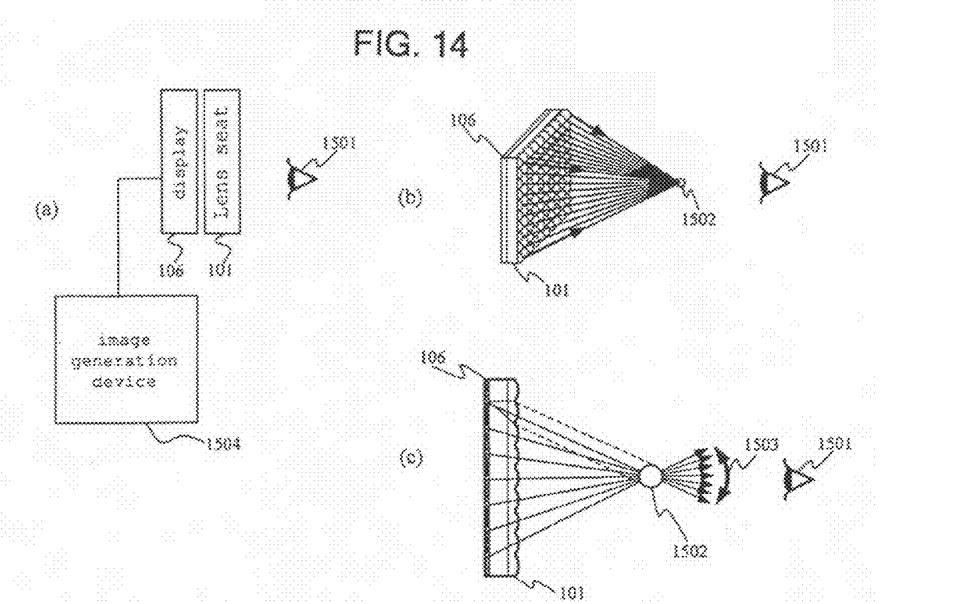
FIG. 14 is an outline chart of a past autostereoscopic display and the image display part.

The lenticular method, the parallax barrier method, the integral photography method, and the holography method, etc are known as a method of displaying the stereoscopic vision which can be observed by the naked eye. FIG. 14(a) is an outline chart where the entire past autostereoscopic display is shown, and FIG. 14(b) and FIG. 14(c) are outline especially charts where they explain the integral photography method.

Lens sheet 101 where the convex lens is arranged like the array is set up in front of display 106 as shown in FIG. 14. It explains the integral photography method which is one of the methods of displaying the stereoscopic vision which can be observed by the naked eye by using these figures. In FIG. 14(b), a three dimensional position is shown, and one section in that is FIG. 14(c).

When the pixel on display 106 is very small compared with the lens, and the pixels at the position of white circle 1502 shown in FIG. 14(b) (c) are displayed on display 106 with a certain color and brightness, light from the pixels gathers in the position of white circle 1502 by the effect of lens sheet 101, and it becomes a ray which spreads from that point.

When observer 1501 observes this field of view 1503 shown in FIG. 14(c), it comes to be able to perceive a point light, namely an object exists in the white circle 1502. It is also possible to use the pinhole instead of this lens.

Moreover, the lenticular method that achieves the stereoscopic effect only in horizontal direction by using binocular parallax exist, too, in the way the lenticular lens sheet with half cylinder shaped lenticular lens is set up in front of display 106 instead of the convex lens, and the slender images for the right eye and the left eye which are alternately arranged along the longitudinal direction of the lenticular lens are displayed in display 106. In these methods, the image displayed on display 106 is generated with image generation device 1504 for the binocular vision shown in FIG. 14(a).

PC which generates computer graphics, multi eye camera, and single eye type cameras combined with lens sheet, etc. are enumerated as image generation device 1504 for the binocular vision.

The technology concerning the lenticular method is indicated in a past technology.

The technology, which makes the non-luminescence area (black matrix) between pixels unremarkable by devising the arrangement of the pixel on the display, is indicated in JP3101521B (hereafter, patent document 1).

The technology, which makes the black matrix between pixels unremarkable by expanding each pixel with the lens, is indicated in JP2540999B (hereafter, patent document 2).

Figure 15:
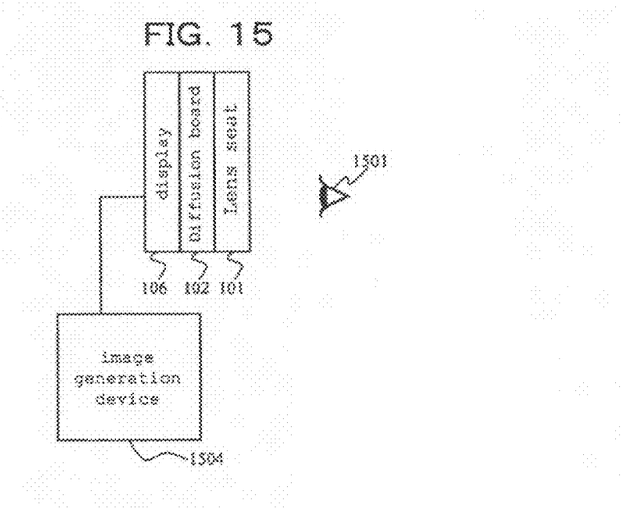
FIG. 15 is an outline chart of a past autostereoscopic display.

The technology, which makes the black matrix between pixels unremarkable by installing diffusion board 102 between display 106 and lenticular lens sheet 101 as shown in FIG. 15, is indicated in JP2777241B (hereafter, patent document 3).

The technology, which avoids unnatural binocular vision caused when the light which penetrates a pixel passes through the lenticular lens that is not correctly associated with the pixel by inserting the shading film between each lenticular lenses of the lenticular lens sheet, and the street in the lenticular lens which is not the lenticular lens that light, which penetrates the pixel, is correctly associated with the pixel, is indicated in JP289320B (hereafter, patent document 4).

SUMMARY OF THE INVENTION

The technology, which had been described to patent document 1, changed the arrangement of the pixel on the display, and it had the problem that the cost of execution rose because it was not able to use a general purpose display.

The technology, which had been described to patent document 2, had the problem that the cost of execution rose, because a lot of numbers of lenses which expanded the pixel were necessary.

The technology, which had been described to patent document 3, had the problem that the reproduced stereoscopic vision blotted by the color of each pixel mixing with the color of the next pixel.

There were problems in the technology of the description to patent document 4. First problem is that black matrix between pixels stands out by being expanded with lens. Second problem is that assumed color cannot be shown to the observer by the Red and the Green and the Blue each display part's of each subpixel being expanded, and causing the color separation.

The assumed color cannot be shown to the observer by The Red and the Green and the Blue each display part's of each subpixel being expanded, and causing the color separation.

Figure 16:
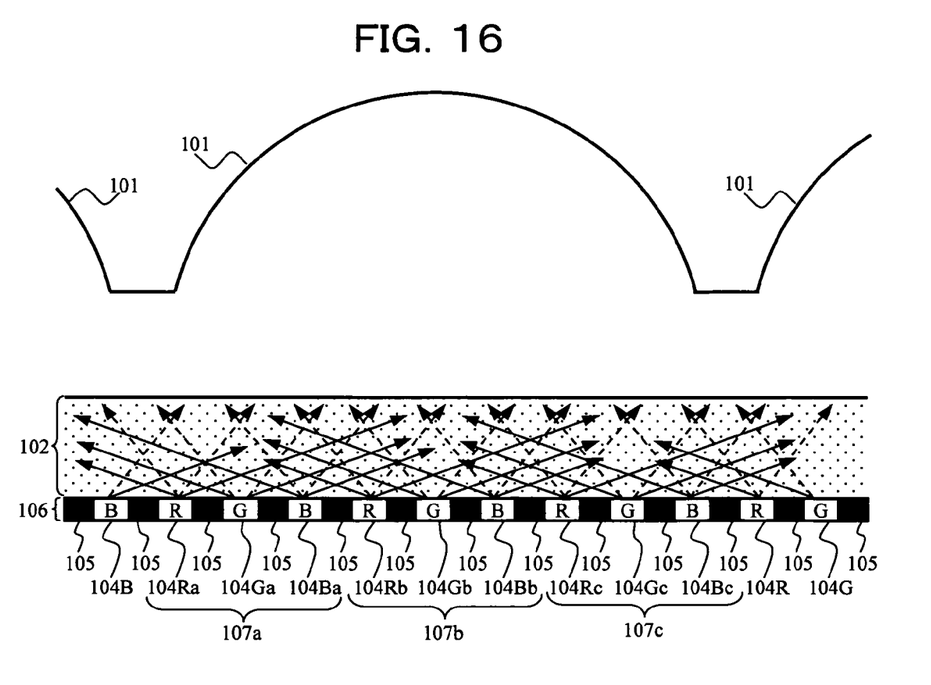
FIG. 16 is an outline chart of the image display part in a past autostereoscopic display.

FIG. 16 is an outline chart where the part of the display of the image of a past auto stereoscopic display is shown. The image display part is an installation of diffusion board 102 between lens sheet 101 and display 106 in this figure.

The purpose to use diffusion board 102 is, before the ray reaches lens seat 101, for instance, to avoid the color separation, by mixing three primary colors that red subpixel 107Ra, green subpixel 107Ga, and blue subpixel 107Ba of pixel 107a.

However, there is a problem that it mixes by three primary colors of the adjoining pixel such as Blue subpixel 107Ba of pixel 107a and red subpixel 107Rb of pixel 107b, and the color of the reproduced stereoscopic vision blots in a past technology. Therefore, the composition, in which the mixture of three primary colors of the adjoining pixel is canceled, is needed.

Then, the purpose of this invention is to offer the autostereoscopic display where the phenomenon that a black matrix and the color separation stand out with the lens is not caused and the phenomenon that the reproduction stereoscopic image blots by the mixture of the color of the pixel is not caused so far according to an easy composition.

In this invention, in the past autostereoscopic display shown in FIGS. 15 and 16, it was assumed the composition in which the trench along the black matrix between pixels was put on the diffusion board 102 disposed between display 106 and lens sheet 101.

Moreover, it was assumed the composition in which the angle of trench achieves the total reflection of incident light of each pixel from inside of diffusion board 102 to the oblique side of the trench. In addition, it was assumed the composition in which the angle of trench achieves the total reflection of incident light of each pixel from inside of diffusion board 102 to the oblique side of the trench.

DESCRIPTION OF THE PREFERRED EMBODIMENTS

Hereafter, it explains the embodiments of this invention with reference to the drawings.

Embodiment 1

Hereafter, it explains embodiment 1 of executing this invention by using FIG. 1 to FIG. 7. In this embodiment, the width of the trench put from the display side to the diffusion board is the same as the width of a black matrix or example of assumption as the angle of trench achieving the total reflection of the incident light from inside of the diffusion board to the oblique side of the trench is the same.

In the embodiment all, the point part of the trench may not be a pointed one, and may have a width, and worn roundness. Moreover, the trench of the embodiments is an isosceles triangle whose center line is perpendicular to the display, passing the center of the black matrix between pixels; however, the requirement need not be strictly met.

Figure 1:
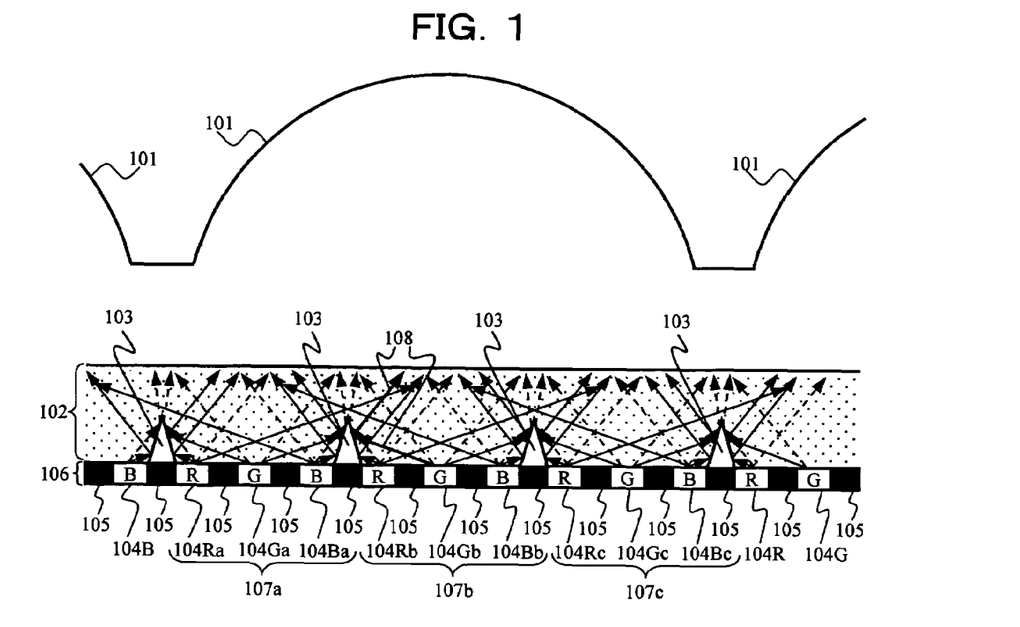
FIG. 1 is an outline chart of the image display part in the autostereoscopic display of the embodiment 1 of the invention.

FIG. 1 is an outline chart where the part of the display of the image of the autostereoscopic display in the embodiment 1 is shown. The above mentioned image display part is an installation of diffusion board 102 between lens sheet 101 and display 106 in FIG. 1.

Display 106 is the one that two or more pixels such as pixel 107a, 107b, and 107c are spread.

Pixel 107a consists of red subpixel 104Ra, green subpixel 104Ga, blue subpixel 104Ba, and black matrix 105 which is the non-display part between each subpixel.

Diffusion board 102 has trench 103 put from a side of display 106 having the same width as the width of black matrix 105 at the position of each black matrix 105 between pixels on the display, and the trench angle of each trench 103 is a total reflection angle for an incident light from the inside of the diffusion board of each pixel to the oblique side of trench 103.

Figure 2:
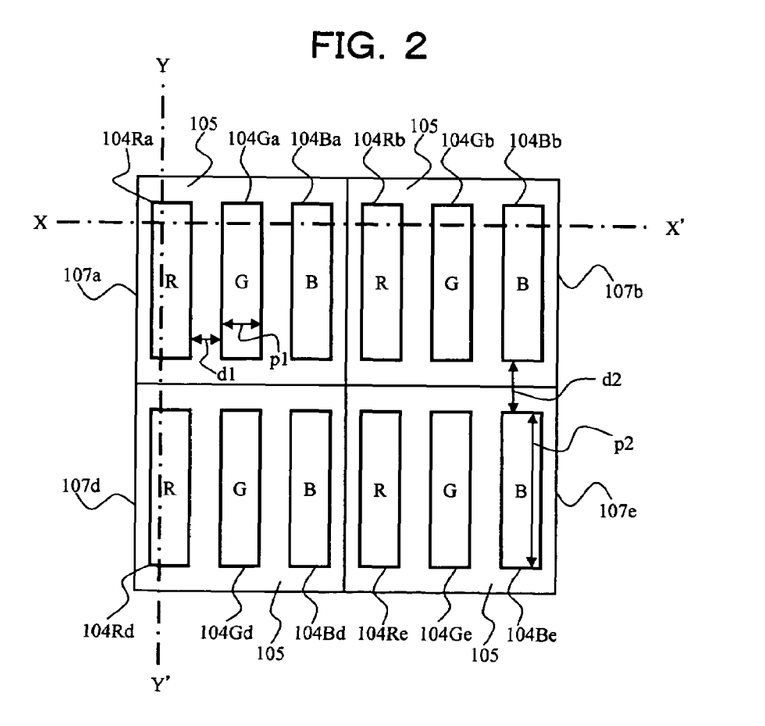
FIG. 2 is a plan where it explains the pixel on the display and the arrangement of pixel and black matrix.

FIG. 2 is a plan view where it explains the pixel on the display and the arrangement of a black matrix used by the embodiments of the invention. Each three primary color display part (subpixel) R, G, and B queue up at equal intervals, and black matrix 105, which is non-display part, exists between each.

Length of the short side of each three primary color display part R, G, and B is assumed to be p1, and length of the long side is assumed to be p2. The width of black matrix 105 in the direction of the short vicinity of each three primary color display part R, G, and B is assumed to be d1, and the width of black matrix 105 in the direction of the vicinity of length is assumed to be d2.

In the each embodiment, it is assumed p1=35.5 µm, p=143 µm, d1=28 µm, and d2=47.5 µm. FIG. 1 is a cross section in one point dot-dashed curve X-X' shown in FIG. 2.

Figure 3:
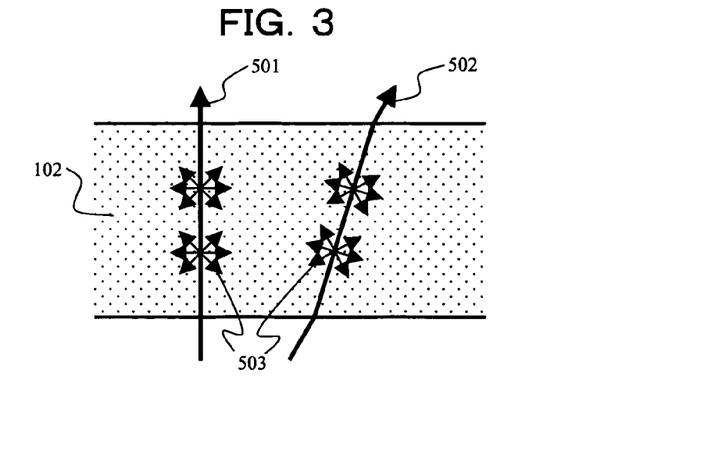
FIG. 3 is an outline chart where it explains the ray which passes in the diffusion board.

FIG. 3 is an outline chart where it explains the ray which passes in the diffusion board in the embodiments. Though ray 501,502 diffuses in direction 503 of diffusion in diffusion board 102, the direction of the ray treated in this text is assumed to be a direction of each ray 501,502 which passes in the medium without diffusive. In a general diffusion board such as the becoming frosted glass, the direction of each ray 501,502 is strong direction of strength of light, and it assumes that it uses such a diffusion board most in the embodiments.

Figure 4:
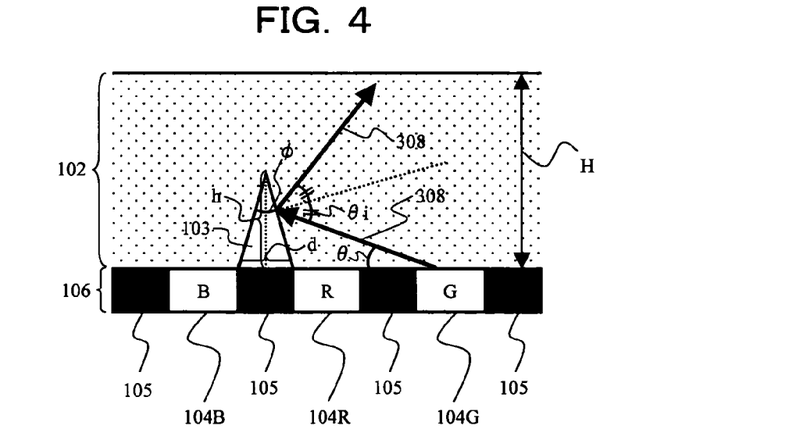
FIG. 4 is a simplified cross-sectional view taken along section line <X-X'> of FIG. 2 where it explains the angle and the length of the trench.
Figure 5:
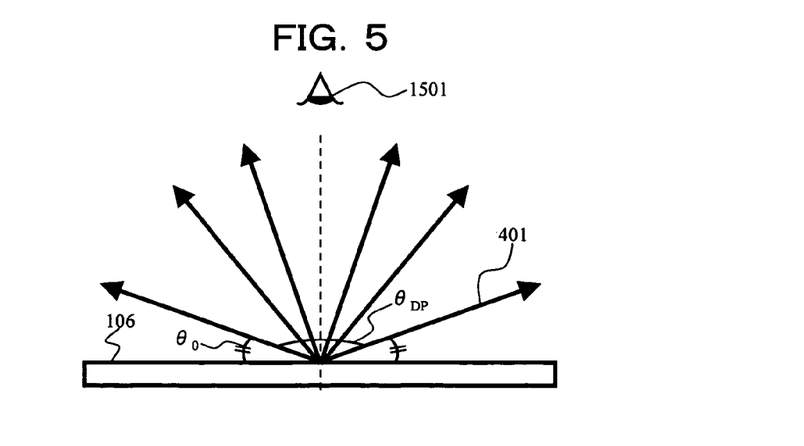
FIG. 5 is an outline chart where it explains the viewing angle on the display.

It explains the shape of trench 103 in this embodiment in detail by using FIG. 1, FIG. 4, and FIG. 5. FIG. 4 is an outline chart where it explains the angle and the length used by the embodiment.

In FIG. 4, ray 308 emitted with the angle θ from display 106 can be reflected to the oblique side of trench 103 which has angle φ, height h, and d in width. Ray 308 has a reflection angle θi as same as an incident angle θi. Moreover, the thickness of diffusion board 102 is assumed to be H=100 µm, and the refractive index is assumed to be n=1.7 in the example of each embodiment. When the ray starts going out from the object with the refractive index n into the air, the incident angle θi that provides the total reflection of the ray in the boundary of the object and air should be a critical angle $θ_M$ or more given by next formula (1). It becomes $θ_M≈36.03°$ in the embodiments.

$$θ_M=\arcsin(1/n) \quad \text{[Formula 1]}$$

FIG. 5 is an outline chart where it explains the viewing angle on the display used by the embodiments. When the display viewing angle on display 106 to observer 1501 is θDP, ray 401 from display 106 is emitted by angle θo or more to display 106 in this figure. θo is given by next formula (2).

$$θo=(180-θ_{DP})/2 \quad \text{[Formula 2]}$$

In the embodiments, it becomes θo=20° assuming display viewing angle θDP=140°.

In FIG. 1, if trench 103 is put in diffusion board 102 with the angle φ that provides the total reflection of ray 108 emitted with angle θo from display 106, the total reflection of all of incident lights from display 106 to trench 103 can occur. Such angle ϕ should fit next formula (3).

$$\phi \geq 2(\theta_M - \theta_{DP})$$ [Formula 3]

Moreover, height h of trench 103 with this angle ϕ is given by next formula (4).

$$h = d/\{2 \tan(\phi/2)\}$$ [Formula 4]

It is ϕ>32.06°, and when assuming ϕ=32.1° for instance, it becomes h=48.66 μm in this embodiment because of d=d1=28 μm.

Figure 6:
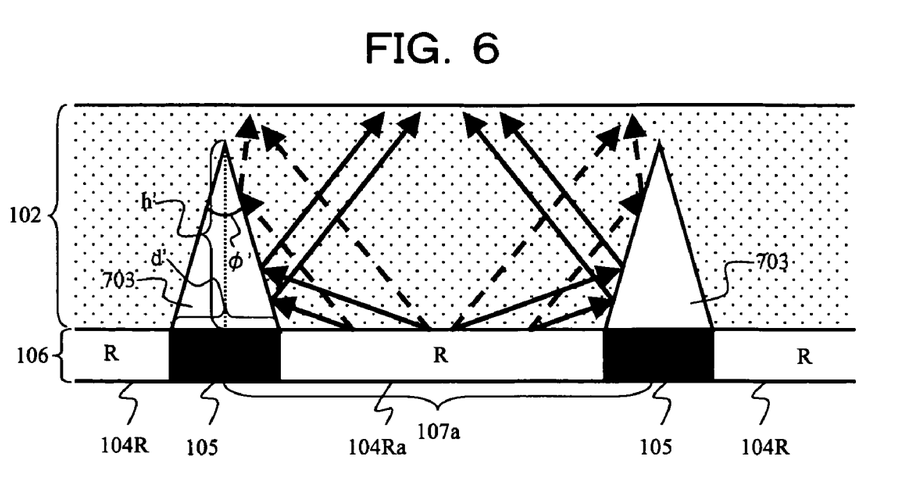
FIG. 6 is a simplified cross-sectional view taken along section line <Y-Y'> of FIG. 2 where it explains the angle and the length of the trench.

FIG. 6 is an outline chart where the part of the display of the image of the autostereoscopic display seen from the side of red display part 104 Ra in this embodiment is shown, and the cross section in one point dot-dashed curve Y-Y' shown in FIG. 2.

Angle ϕ' of trench 703 for the total reflection of all of incident lights to the oblique side of trench 703 only has to fit "ϕ'>32.06°" in FIG. 6 as the embodiment using trench 103.

Because the above mentioned formula are similar, when assuming d' (width of the trench 703)=d2=47.5 μm, and ϕ'=32.1°, it becomes h' (height of the trench 703)=82.55 μm.

Figure 7:
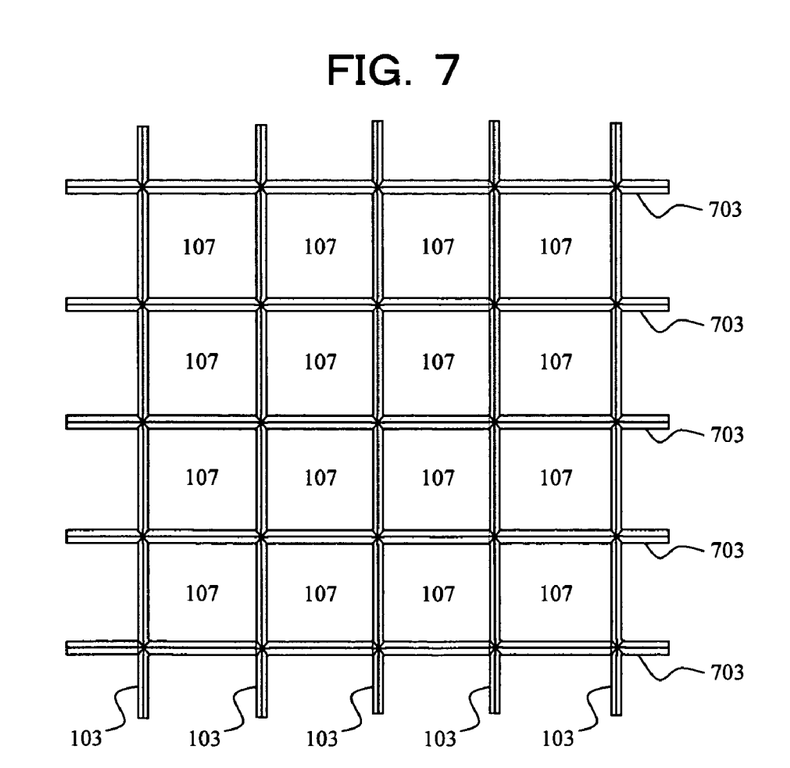
FIG. 7 is a simplified drawing where the configuration of the trench of the diffusion board is shown.

FIG. 7 is a simplified drawing where the configuration of the trench of the diffusion board in this embodiment is shown. Due to the total reflection of the light incident from each pixel to the oblique side of the trench, the mixture of the color of the pixel is reduced and the image quality of the reproduction stereoscopic image can be improved.

Hereafter, it explains the modified embodiment of the embodiment 1 by using FIG. 8 to FIG. 11.

Modified Embodiment 1 of the Embodiment 1

Figure 8:
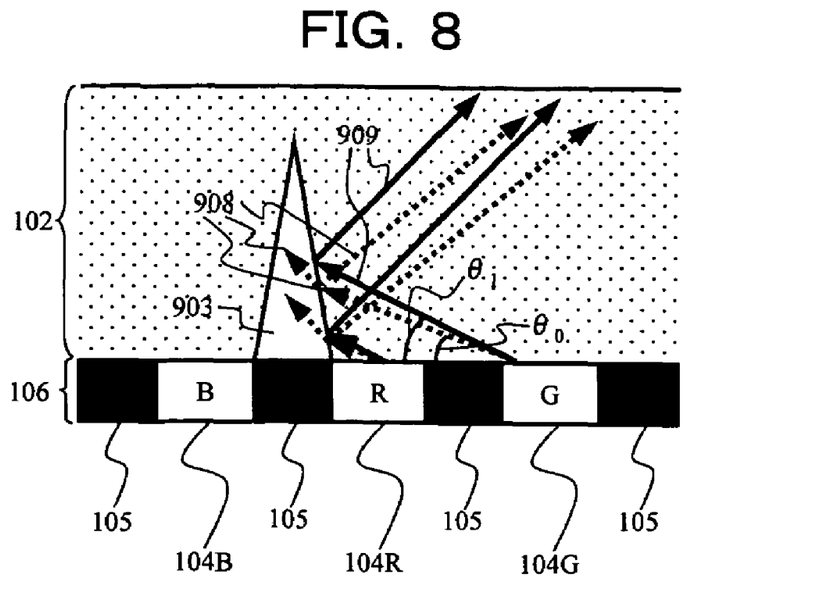
FIG. 8 is an outline chart of the image display part in the autostereoscopic display in a modified embodiment 1 of the embodiment 1.

In FIG. 8, the height of the trench is enlarged, and the modified embodiment 1 of increasing the incident light to the oblique side of the trench is shown. This modified embodiment is an example of explaining the effect when height h of the trench is predetermined. Though only the example of the cross-sectional view along point dot-dashed line X-X' shown in FIG. 2 is shown according to this modified embodiment, cross-sectional view along point dot-dashed line Y-Y' shown in FIG. 2 as shown in FIG. 6 is clear.

FIG. 8 is a simplified drawing where the part of the display of the image of the autostereoscopic display when the width of the trench of the diffusion board is equal to the width of a black matrix is shown in this modified embodiment 1. It is assumed that the trench has height h=80 μm, and width d=d1=28 μm here. When h and d are given, the angle ϕ of the trench is given by next formula (5).

$$\phi = 2 \text{arc} \tan(d/2h)$$ [Formula 5]

It becomes angle ϕ=19.85° of trench 903 in FIG. 8. At this time, ray 908 emitted from display 106 at angle θo=20° does not only have the reflection at the oblique side of trench 903 but also the refraction penetration.

Moreover, angle θ1 that ray 909 from display 106 has the total reflection at the oblique side of trench 903 should fit next formula (6).

$$\theta_1 \geq \theta_M - \phi/2$$ [Formula 6]

As a result, θ1>26.11° can be filled, and all incident ray to the oblique side of trench 903 can be reflected.

Modified Embodiment 2 of the Embodiment 1

Figure 9:
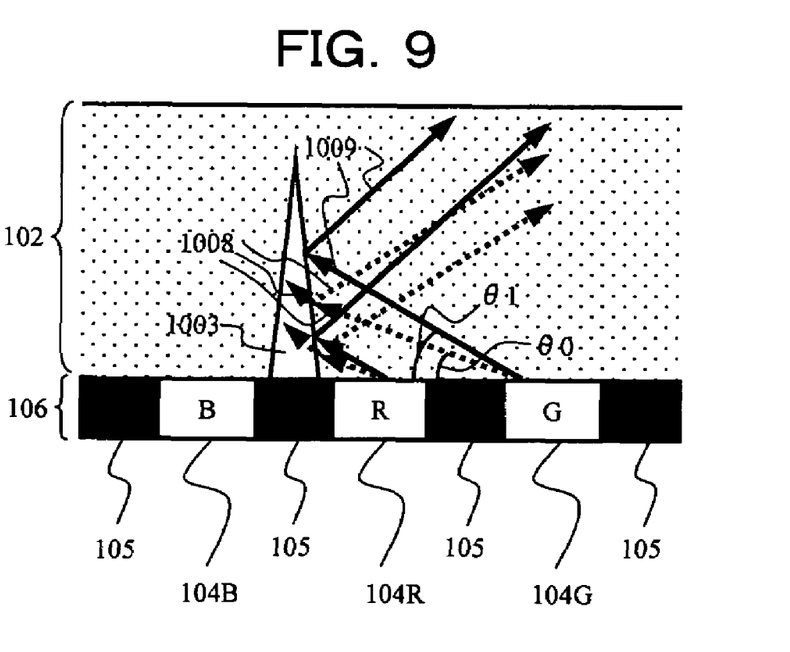
FIG. 9 is an outline chart of the image display part in the autostereoscopic display device in a modified embodiment 2 of the embodiment 1.

FIG. 9 is an outline chaff of the modified embodiment 2 of the width of the trench of the diffusion board showing the part of the display of the image of the autostereoscopic display when it is smaller than the width of a black matrix.

It is assumed that the trench has height h=80 μm and width d=18 μm<d1 here.

In FIG. 9, angle θ1 that provides the total reflection of ray 1009 from display 106 at the oblique side of trench 1003 should fit θ1>29.61° because it becomes angle ϕ=12.84° of trench 1003.

In this modified embodiment, the mixture of the color of the pixel is reduced by enlarging the height of the trench, and increasing an incident ray to the oblique side of the trench, and the image quality of the reproduction stereoscopic image can be improved.

Moreover, because the effect of the improvement is achieved even if the width of the trench is reduced more than the width of a black matrix, accuracy, by which the trench is put, need not be strict.

Modified Embodiment 3 of the Embodiment 1

Figure 10:
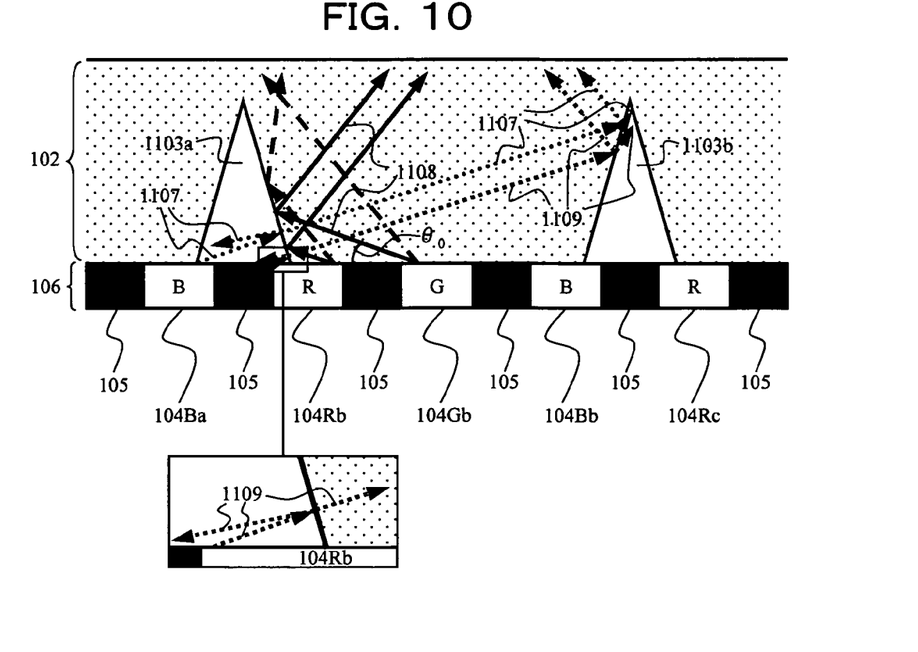
FIG. 10 is an outline chart of the image display part in the autostereoscopic display device in a modified embodiment 3 of the embodiment 1.

It explains the modified embodiment 3 by using FIG. 10. This modified embodiment enlarges the height of the trench as modified embodiment 1, and increases an incident ray to the oblique side of the trench. The embodiment provides the angle of the trench and an incident ray to have a total reflection angle from the inside of the diffusion board to the oblique side of the trench.

This modified embodiment is an example of explaining the effect when height h of the trench and the angle ϕ of the trench are predetermined.

FIG. 10 is an outline chart where the part of the display of the image of the autostereoscopic display in this modified embodiment is shown. Trench 1103a has height h=80 μm, angle ϕ=32.1°, and the total reflection of all incident rays from display 106 through the diffusion board 102 to the slope of the trench 1103a occurs. Here, when h and ϕ are given, width d of the trench is given by next formula (7).

$$d = 2 h \tan(\phi/2)$$ [Formula 7]

It becomes width d=46.03 μm>d1 of trench 1103a in FIG. 10.

At this time, because a part of red subpixel 104Rb and blue subpixel 104Ba overlaps with trench 1103a, incident ray 1109 comes out of red subpixel 104Rb, and incident ray 1107 comes out from blue subpixel 104Ba through the inside of trench 1103a to the oblique side of trench 1103a. They have an incident reflection and refractive penetration to the oblique side of trench 1103b adjacent thereto.

In this modified embodiment, by making the height of the trench enlarged, and an incident ray to the oblique side of the trench increased, the angle of the trench providing full reflection of all incident light can be achieved. The mixture of the color of the pixel is reduced, and the image quality of the reproduction stereoscopic image can be improved.

Moreover, because the effect of the improvement is achieved even if the width of the trench is enlarged more than the width of a black matrix, accuracy of the trench needs not be strict.

Modified Embodiment 4 of the Embodiment 1

Figure 11:
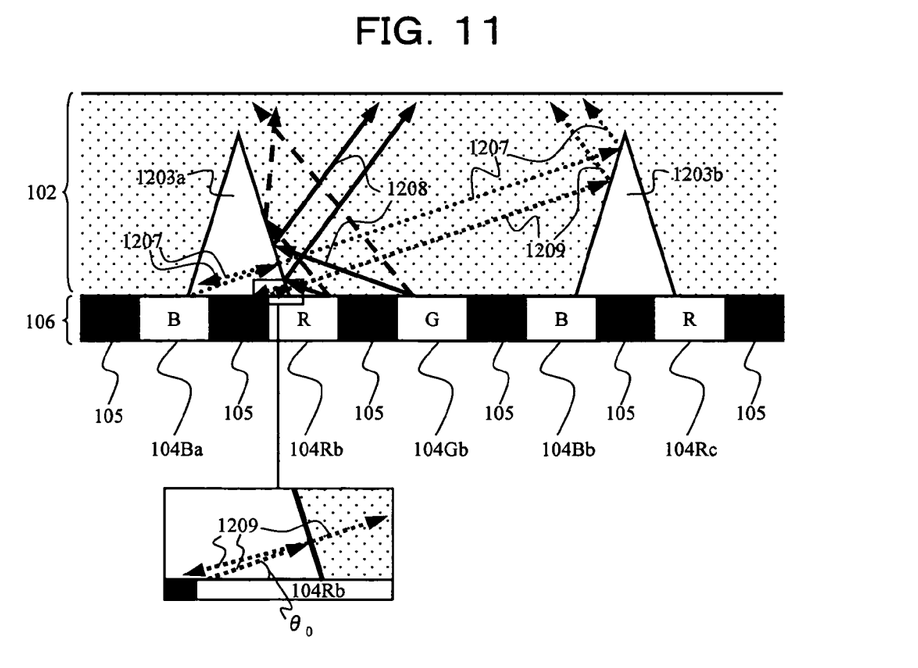
FIG. 11 is an outline chart of the image display part in the autostereoscopic display in a modified embodiment 4 of the embodiment 1.

It explains the modified embodiment 4 by using FIG. 11. In the modified embodiment, the height of the trench is enlarged and an incident ray is increased to the oblique side of the trench as the modified embodiment 1. Additionally, not only does total reflection occur, but also the angle of the trench and an incident ray from the inside of the diffusion board to the oblique side of the trench are provided. Also, an incident ray from a part of the display through the trench to an oblique side of the trench may have a refraction penetration and an adjacent trench having an angle can provide a total reflection of the incident ray at the oblique side of the adjacent trench.

FIG. 11 is an outline chart where the part of the display of the image of the autostereoscopic display in this modified embodiment 4 is shown. Trench 1203a can have h=80 μm in height. Ray 1209 comes from red subpixel 104Rb at angle θo can be partially reflected to display 106. A part of ray 1209 having the refraction penetration in the oblique side of trench 1203a can have a total reflection at the oblique side of trench 1203b next to trench 1203a. The angle φ of the trench should fit next formula (8).

$$\arc \sin \{(1/n)\sin(\theta_o - \phi/2)\} + \phi \geq \theta_M \qquad [\text{Formula 8}]$$

It is φ>34.37°, and when assuming φ=34.38° for instance, it becomes d=49.5 μm>d1 from formula (8) in this modified embodiment. In this modified embodiment, the height of the trench is enlarged and an incident ray is increased to the oblique side of the trench. In addition, a light comes from the part of the display in the trench and is an incident ray reaching the oblique side of the trench from the inside of the diffusion board. The incident ray can have a total reflection including the part of the ray which has the refraction penetration (Because it goes out of the part of the display in the trench and strength of the light is weak, the ray, which reflects in the oblique side of the trench, is disregarded). The mixture of the color of the pixel is reduced, and the image quality of the reproduction stereoscopic image can be improved.

Embodiment 2

Figure 12:
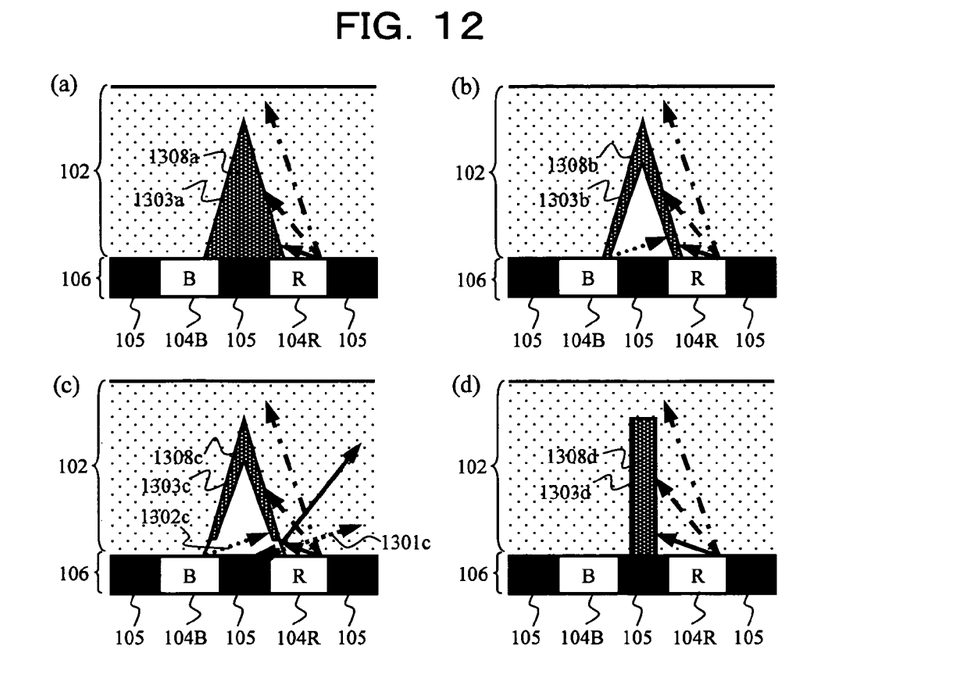
FIG. 12 is an outline chart of the image display part in the autostereoscopic display in the embodiment 2 of the invention.

Hereafter, it explains the embodiment 2 of the invention by using FIG. 12. This embodiment is an example of forming to the trench the shading layer where light is absorbed.

FIG. 12 is an outline chart where the part of the display of the image of the autostereoscopic display in this embodiment is shown. FIG. 12(a) is an example of filling shading layer 1308a to trench 1303a of the same type as the modified embodiment 3 of the embodiment.

Moreover, FIG. 12(b) is an example of forming shading layer 1308b thinly to the inner wall of trench 1303b of the same type as the modified embodiment 3.

Moreover, FIG. 12(c) is an example of thinly forming shading layer 1308c under the inner wall of trench 1303c of the same type as the modified embodiment 3. Ray 1302c emitted from blue subpixel 104B in trench 1303c is absorbed by shading film 1308c, and ray 1301c emitted from red subpixel 104R in trench 1303c has the refraction penetration.

Moreover in FIG. 12(d), the width of trench 1303d is smaller than the width of black matrix 105, and example of filling shading layer 1308d to trench 1303d whose shape is a rectangle is provided, when the shading layer is formed. Thus, when the reflection layer is formed, the shape of the trench can be freely decided.

The shading layer is formed to the trench, the mixture of the color of the pixel is reduced, and the image quality of the reproduction stereoscopic image can be improved in this execution example above.

Embodiment 3

Figure 13:
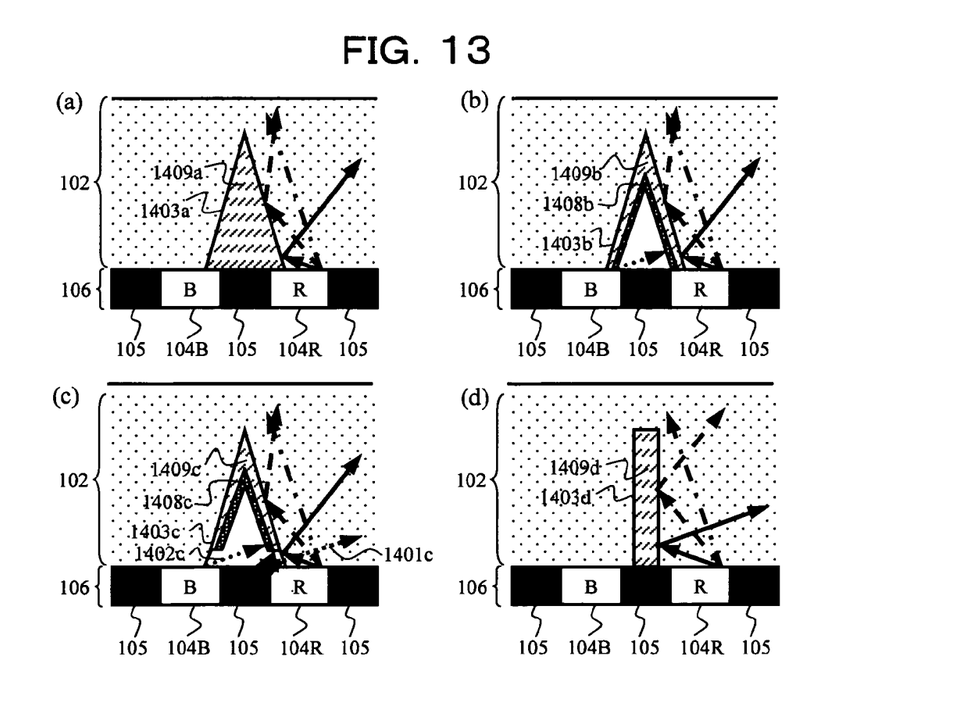
FIG. 13 is an outline chart of the image display part in the autostereoscopic display in the embodiment 3.

Hereafter, it explains the embodiment 3 of the invention by using FIG. 13. This embodiment is an example of forming the reflection layer where light is reflected to the trench.

FIG. 13 is a simplified drawing where the part of the display of the image of the autostereoscopic display in this embodiment is shown. FIG. 13(a) is an example of filling reflection layer 1409a to trench 1403a of the same type as the modified embodiment 3 above described.

Moreover, FIG. 13(b) shows that reflection layer 1409b is thinly formed to the inner wall of trench 1403b of the same type as modified embodiment 3. It is an example of thinly forming shading layer 1408b. In addition, an incident ray from inside of diffusion board 102 reflects to the oblique side of trench 1403b, and the ray in trench 1403b is absorbed.

Moreover, FIG. 13(c) is an example of thinly forming reflection layer 1409c under the inner wall of trench 1403c of the same type as modified embodiment 3, and forming shading layer 1408c thinly. In addition, ray 1402c emitted from blue display part 104B in trench 1403c is absorbed by shading film 1408c, and ray 1401c emitted from red display part 104R in trench 1403c has the refraction penetration.

Moreover, FIG. 13(d) is an example that the width of the trench 1403d is smaller than the width of black matrix 105. Also, FIG. 13(d) is an example of filling reflection layer 1308d to trench 1403d whose shape is a rectangle. Thus, when the reflection layer is formed, the shape of the trench can be freely decided.

The reflection layer is formed to the trench, the mixture of the color of the pixel is reduced, and the image quality of the reproduction stereoscopic image can be improved in this embodiment.

In setting up the diffusion board which puts the trench along the black matrix between pixels between the display and the lens sheet according to the embodiments, a black matrix and the color separation can be desirably achieved. The blot of the color of the reproduction stereoscopic image by the color of the pixel which is mutually adjacent mixing can be improved.

According to this invention above, the phenomenon that a black matrix and the color separation stand out with the lens is not caused because the pixel is separated mutually though three primary colors of each pixel are diffused, moreover, the reproduction stereoscopic image does not cause the phenomenon in which blotting by the mixture of the color of the pixel, and be able to display a <high-resolution> stereoscopic image.

What is claimed is:

1. An autostereoscopic display comprising:
    a display having non-luminescence areas formed between pairs of adjacent pixels, each pixel including a blue subpixel, a red subpixel, and a green subpixel;
    a lens sheet disposed over the display, the lens sheet including a plurality of lenses; and
    a diffusion board placed between the display and the lens sheet, the diffusion board including trenches formed therein and positioned over the non-luminescence areas of the display.

2. An autostereoscopic display according to claim 1, wherein the trenches are configured such that light from the pixels propagating through the diffusion board is totally reflected by surfaces thereof.

3. An autostereoscopic display according to claim 1, wherein each trench is shaped as an isosceles triangle.

4. Autostereoscopic display according to claim 1, wherein each trench is a rectangle.

5. An autostereoscopic display according to claim 1, wherein a width of each trench along a surface of the diffusion board is substantially equal to a width of the non-luminescence area.

6. An autostereoscopic display according to claim 1, wherein a width of each trench along a surface of the diffusion board is smaller than a width of the non-luminescence area.

7. An autostereoscopic display according to claim 1, wherein a shading layer is formed within each trench to absorb a light.

8. An autostereoscopic display according to claim 7, wherein the shading layer fills each trench.

9. An autostereoscopic display according to claim 7, wherein the shading layer is formed as a layer of material on a surface of each trench.

10. An autostereoscopic display according to claim 7, wherein the shading layer is formed on a surface of each trench and separated from a surface of the display.

11. An autostereoscopic display according to claim 10, wherein a reflection layer is formed in each trench to reflect light.

12. An autostereoscopic display according to claim 11, wherein the reflection layer is filled in each trench.

13. An autostereoscopic display according to claim 11, wherein the reflection layer is a layer of material formed on a surface of each trench and the shading layer is formed on the reflection layer.

14. An autostereoscopic display according to claim 11, wherein the reflection layer is a layer of material formed on a surface of each trench and separated from a surface of the display, and the shading layer is formed on the reflection layer.

15. An autostereoscopic display according to claim 11, wherein each trench is rectangular, a width of the trench along a surface of the diffusion board is smaller than a width of the non-luminescence area, and the reflection layer is filled in the trench.

16. An autostereoscopic display according to claim 7, wherein each trench is rectangular and a width of said each trench along a surface of the diffusion board is smaller than a width of the non-luminescence areas, and the shading layer is filled within said each trench the.

* * * * *